United States Patent
Prat Gomà et al.

(10) Patent No.: US 8,306,436 B2
(45) Date of Patent: Nov. 6, 2012

(54) HOMODYNE RECEIVER FOR OPTICAL COMMUNICATIONS WITH POST PROCESSING

(75) Inventors: Josep Prat Gomà, Barcelona (ES); Josep Maria Fàbrega Sànchez, Barcelona (ES)

(73) Assignee: Universitat Politecnica de Catalunya, Barcelona (ES)

( * ) Notice: Subject to any disclaimer, the term of this patent is extended or adjusted under 35 U.S.C. 154(b) by 385 days.

(21) Appl. No.: 12/521,619

(22) PCT Filed: Dec. 28, 2007

(86) PCT No.: PCT/ES2007/000778
§ 371 (c)(1),
(2), (4) Date: Jan. 5, 2010

(87) PCT Pub. No.: WO2008/081065
PCT Pub. Date: Jul. 10, 2008

(65) Prior Publication Data
US 2010/0098438 A1   Apr. 22, 2010

(30) Foreign Application Priority Data
Dec. 29, 2006   (ES) ................................ 200700041

(51) Int. Cl.
*H04B 10/06* (2006.01)
(52) U.S. Cl. .................... 398/204; 398/206; 398/207
(58) Field of Classification Search .......... 398/202–207
See application file for complete search history.

(56) References Cited

U.S. PATENT DOCUMENTS

| | | | |
|---|---|---|---|
| 5,319,438 A * | 6/1994 | Kiasaleh | 398/203 |
| 5,381,446 A | 1/1995 | McIntosh | |
| 5,396,361 A * | 3/1995 | Sasaki et al. | 398/1 |
| 5,510,927 A * | 4/1996 | Noe | 398/204 |
| 7,085,501 B1 * | 8/2006 | Rickard et al. | 398/202 |
| 2004/0091066 A1 | 5/2004 | Noe | |
| 2004/0114939 A1 | 6/2004 | Taylor | |
| 2005/0008369 A1 * | 1/2005 | Winzer | 398/83 |
| 2011/0129230 A1 * | 6/2011 | Zanoni et al. | 398/140 |

OTHER PUBLICATIONS

Barry et al., "Performance of Coherent Optical Receivers," Proceedings of the IEEE, vol. 78, No. 8, Aug. 1990, pp. 1369-1394.
Kazovsky, "Phase- and Polarization-Diversity Coherent Optical Techniques," Journal of Lightwave Technology, vol. 7, No. 2, Feb. 1989, pp. 279-292.

(Continued)

*Primary Examiner* — Dzung Tran
(74) *Attorney, Agent, or Firm* — RatnerPrestia

(57) ABSTRACT

A receiver including a fiber optic first input element, through which a signal carrying information circulates, a local laser block, a photo-detection block, and a block of differential demodulation is disclosed. The information-carrying signal of the optical fiber input and the beam of light generated by the local laser block provided in the receiver are coupled and detected in a block of optical detection, which converts the optical signal that carries information into an electrical signal that carries information, which is processed in a block of electrical demodulation, which performs a differential demodulation of its in-phase and quadrature components, combining them later. An optical receiver is obtained, featuring optical homodyne detection, being coincident the wavelengths of the input signal and the tuned beam of light, with a high tolerance to the phase noise, generated by the optical communications lasers, and with no need to use an optical phase-locked loop.

21 Claims, 1 Drawing Sheet

OTHER PUBLICATIONS

Davis et al., "Phase Diversity Techniques for Coherent Optical Receivers," Journal of Lightwave Technology, vol. LT-5, No. 4, Apr. 1987, pp. 561-571.

Agrawal, "Fiber-Optic Communications System Third Edition," John Wiley & Sons, Inc., 2002, pp. 1-281.

Betti et al., "Coherent Optical Communications Systems—Chapter 6," John Wiley & Sons, Inc. 1995, pp. 243-313.

Kazovsky, "Balanced Phase-Locked Loops for Optical Homodyne Receivers: Performance Analysis, Design Considerations, and Laser Linewidth Requirements," Journal of Lightwave Technology, vol. LT-4, No. 2, Feb. 1986, pp. 182-195.

Norimatsu et al., "PLL Propagation Delay-Time Influence on Linewidth Requirements of Optical PSK Homodyne Detection," *Journal of Lightwave Technology*, vol. 9, No. 10, Oct. 1991, pp. 1367-1375.

Kazovksy, "*Homodyne Phase-Shift-Keying Systems:* Past Challenges and Future Opportunities," Optical Fiber Communication Conference-OFC'2005-, records OTuL3, Anaheim, CA, Mar. 2005.

Camatel et al., "Optical phase-locked loop for coherent detection optical receiver," Electronics Letters, Mar. 18, 2004, vol. 40, No. 6.

International Search Report for PCT Application No. PCT-ES2007/000778 mailed Jul. 11, 2008.

* cited by examiner

HOMODYNE RECEIVER FOR OPTICAL COMMUNICATIONS WITH POST PROCESSING

This application is a U.S. National Phase Application of PCT International Application No. PCT/ES2007/000778, filed Dec. 28, 2007 which is incorporated fully herein by reference.

FIELD OF INVENTION

This invention relates to optical signal transmission through a fiber optic cable. Specifically, the present invention relates to a system and a method for detection of coherent optical signals using signal processing to recover signals.

BACKGROUND OF THE RELATED ART

The use of fiber optic cables for the transmission of information was introduced years ago. Recently, with the growing demand for transmission of large amounts of information at high speed, the usefulness of such transmission of optical signals becomes evident. (G P Agrawal "Fiber Optic Communication Systems" John Wiley & Sons, 2002). The transmission of this information typically is done by means of binary digits (logical ones and zeros). But also analog signals are allowed, such as cable television signals.

In the 90's, Wavelength Division Multiplexing (WDM) was introduced at a commercial level. This is a technique that made possible to transmit multiple wavelengths in parallel; and, thus, increase the optical fiber capacity of carrying information.

Moreover, since some years ago, the research community is investigating how should be the deployment of fiber optic networks, in order to reach the final user home (Fiber To The Home, FTTH). It is intended that, in such networks, a single distribution fiber can carry one wavelength per user. Then, the maximum output is obtained when one reaches the maximum number of wavelengths possible in a single fiber. Therefore, what is pretended is to make as narrow as possible the separation between channels.

A fiber optic communications system, in its most basic scheme, consists of an emission block, called optical transmitter, which is intended to transform the information into light (usually that incoming information is driven in the form of electrical signal); a transmission media, which is optical fiber; and a reception block, which is intended to transform the optical information received into an electrical signal containing such information. This last block is called optical receiver. It should be noted, that the transmitter block usually contains an optical light source, which can be, for example, a laser diode or a light emitting diode (LED); while the optical receiver contains an optical detector, which can be, for example, a photo-diode (PIN or avalanche) or a photo-transistor. The optical transmitter and receiver include connectors capable to couple and connect them to the optical fiber.

Regarding the transmitter, it is composed of a light source, preferably a laser, and modules (optional, depending on the modulation format), placed next to it, in order to introduce the information to be transmitted. The modulation formats can be different, and most of them are simple adjustments to their versions used in the field of radio and satellite communications. Thus, we have modulations of phase, amplitude, frequency, etc. for transmitting the information.

It is known, in the field of optical receivers, the use of direct detection optical receivers and the use of coherent optical receivers.

The architecture of direct detection optical receivers is based, primarily, on a photo-detector followed by an amplifier, and signal processing circuits. Thus, the receiver converts an optical signal into and electrical signal proportional to the incident optical power, which is subsequently processed. The main drawbacks of optical direct detection are the selection of optical channel and the noise, meaning noise any unwanted change of the signal that carries information on the communications system. It is also noteworthy that these receivers are not able to recover the phase of the optical signal. Thus, the possibility of using optical phase modulation and similar is automatically excluded.

On the other hand, coherent detection optical receivers, that are described in (Silvelo Betti, Giancarlo of Marchis, Eugenio Iannone, "Coherent optical communications systems," John Wiley & sons, inc. 1995), receive an optical signal carrying information and couple it with the light coming from a local laser oscillator, for obtaining the information in baseband or intermediate frequency at the electric output of the photo-detector, due to the interference between the two light beams, in a manner similar to the receivers of current radio systems. When the information is down-converted to a baseband signal, the receiver is said to be homodyne. In other cases of reception, it is said to be heterodyne.

Importantly, homodyne detection improves the performances of an optical receiver, like sensitivity and frequency selectivity of the optical transmission, but has the disadvantage of needing lasers highly coherent and an optical phase-locked loop (oPLL). This oPLL is a device that still is at experimental stage, having a complex design and a high cost. That is the reason why, at present moment, homodyne detection is possible only performed in laboratory experiments, like the types of oPLL that have been demonstrated: mainly, the balanced loop, and the Costas Loop (see L G Kazovsky Balanced phase-locked loops for optical homodyne receiver: Performance analysis, design considerations, and laser linewidth requirements "Journal of Lightwave Technology, Volume 4, Issue 2, February 1986 Page (s): 182-195, or S. Norimatsu and K. Iwashita "PLL propagation delay-time influence on linewidth requirements of optical PSK homodyne detection" Journal of Lightwave Technology, Volume 9, Issue 10, October 1991 Page (s): 1367-1375). All of them require a laser spectral linewidth less than 0.1% of the transmission speed, and a loop delay lower than their coherence time.

There is now considerable research activity to solve these problems, because this type of reception is theoretically described as the most advantageous (see for example "Homodyne Phase-Shift-Keying Systems: Past and Future Challenges Opportunities" L. Kazovsky in the Optical Fiber Communications Conference -OFC'2005-, records OTuL3, Anaheim, California, USA, March 2005). Recently, some vanguard homodyne receivers have been proposed, such as S. Camatel (Electronics Letters, Volume 40, Number 6, June 2004), where the oPLL operates aided by an electrical subcarrier, which can lock the phase of the received signal at high speed, but requires a coherent and high-cost laser. Other proposals, such as those of R. Noe (U.S. patent 2004/0091066 "Apparatus and Method for a Carrier Recovery" of 13/05/2004) or M.G. Taylor (U.S. patent 2004/0114939 "Coherent Optical Detection and Signal Processing Method and System of 17/06/2004) are based on estimate and recover the carrier phase using a digital signal processor. Such estimation today is unlikely to be implemented for high speed transmission over optical fiber.

Given the nowadays expectations of growth of fiber optic networks, and the benefits of homodyne reception, we understand that there is a need for such a reception system, with all its benefits in terms of sensitivity and selectivity; that can be implemented easily with very simple components, and can be of potential low cost.

DESCRIPTION OF THE INVENTION

The aim of the present invention is to solve the problems above mentioned, in order to make the system more robust and cheap. One of the key features of the invention is the electric post-processing that performs differential demodulation in phase diversity, using the in-phase and quadrature components, that were previously split and are properly combined later again. With this technique, the optical channel tuning does not require a phase matching between the two lasers, and that tuning can be performed by a local laser oscillator and electrical filtering in baseband channel. By this homodyning technique, substantial improvements are achieved in the performance of the optical transmission, such as sensitivity and frequency selectivity of the invented receiver. None of the proposals published earlier, some mentioned before, use this homodyne detection system with differential demodulation; that is not strictly synchronous, but includes its advantages and reduces its requirements. The associated sensitivity penalty is almost negligible.

The optical communications receiver is characterized by the fact that includes an optical detection unit (connected between the optical fiber and the input of the differential demodulation block) which converts the optical signal carrying information into an electrical signal carrying information, through the coupling between the optical signal carrying information and a beam of light in the same nominal wavelength generated by the local laser block, which includes a laser device whose beam of light acts as a local oscillator of the optical detection block. The differential demodulation is twofold: both for the in-phase component (cI) and the quadrature component (cQ), being properly combined once demodulated. This means that while the lasers' phase noise fluctuates between the signal components cI and cQ, each of them is demodulated separately and, afterwards, they are properly combined to recover the original signal.

The differential demodulation consists on multiplying signal herself delayed (with a mixer or similar). The delay time is of the order of a bit time. The information signal passes through a block of regeneration, which recovers the synchronism of the signal and performs the bit decision, giving at the output of the receiver, a digital signal free of noise.

Another advantage of differential demodulation is that the problem can be translated to the domain of digital signal processing. In this case, Analog to Digital Converters (ADC) are used to later, by means of a digital processor, estimate phase jumps from one bit to the next one. So, at the output of the receiver, a digital signal free of noise can also be obtained.

Thus, we get a receiver for optical communications with benefits similar to a homodyne system but with a much higher tolerance in front the lasers' phase noise, similar to a differential heterodyne system (with a spectral linewidth of the order of 1% of the transmission speed), as there is no need to synchronize the phase of the optical signal, but simply adjust the wavelength or optical frequency of the local laser to the one of transmitter laser, within a margin of error that could go up to 10% of the speed of transmission or so. So, if digital transmission speed increases, delay time of the differential demodulator is reduced and, therefore, the impact of the phase noise of lasers and the possible optical frequency drift is dramatically reduced. As a result of this, commercially available semiconductor lasers can be used to implement such systems. This is not the case of the previous homodyne detection systems, which require an optical Phase-Locked Loop (oPLL). This is still an experimental device, and is only available in laboratories.

Thus, the receiver object of the invention allows, with relative low cost, to tune and receive optical signals present in the optical fiber with high selectivity, because the filtering is electrical and not optical, as happens in conventional wavelength multiplexed systems. This is done by simply changing the wavelength of the local laser, similar to a radio tuner. In addition, the heterodyned signal is directly baseband down-converted (intermediate frequency zero, or very low), thus the separation between optical channels can be even closer, and the receiver much simpler.

For demodulating the in-phase (cI) and quadrature (cQ) components, it is necessary to previously separate them. This is done by means of time switching phase diversity. This gives the energy of one of the components of the signal (cI or cQ) during the first half of the bit period, and the energy of the other component (cQ or cI), in sync with the clock. In the same way, other subdivisions are allowed and valid. To that end, the sync signal or clock recovered in the regeneration unit (optionally), is filtered and used to alter the optical signal that comes from the local laser, and get the desired effect. So, one can use different waveforms to achieve that goal. One way to carry it out is by filtering and amplifying the synchronization signal and drive it onto the RF port of the local Laser. In this case, the system is distributing cI and cQ components' energies, with a sinusoidal phase alteration. Another alternative would be to use the same waveform, but driving it to an external phase modulator advantageously placed at the output of the local laser. By this way, one can heterodyne both optical signals, while representing in phase and quadrature components.

After differential demodulation, each of the components (cI, cQ) must be combined or coupled, because the information signal strength has been randomly distributed among both, due to phase noise and drifts. One way to combine the component is simply choosing the one that has more power at each bit period. Another advantageous possibility is the sum of the two components.

The inclusion of this block of phase differential demodulation, with the combination of cI/cQ components after the optical coherent detection of each one of them, is the feature that leverages the advantages of a homodyne detection system without using an oPLL. This solves a problem of conventional homodyne systems, in which the light beam generated by the local laser must be perfectly synchronized with the phase of the carrier of the information signal received, which has been generated by a device laser placed at a distance that can be of kilometers far from the local laser oscillator. That is why high-quality lasers are required, and an extremely fast phase feedback loop (oPLL) should be implemented at the receiver side.

Preferably, the optical detection block includes an optical coupler to combine the information-carrying input signal and the light beam generated by the local laser. It also includes an optical photo-detector, or more, to perform the optoelectronic conversion. Advantageously also includes an electrical amplifier, that aims to increase the signal level with a low noise level, and has a bandwidth suitable for optical signals, as well as a low-pass filter to equalize the signal and limit the noise effects. Advantageously, the detection block can be based on a balanced scheme, which includes a second balanced photo-detector unit, receiving the remainder of the output of the optical directional coupler. The output of such second balanced photo-detector unit is subtracted with the first one, to get a baseband signal with maximum output. Using a balanced scheme entails optimal use of the power of the local laser device.

Advantageously, the optical detection unit also includes a compensation for possible variations in the state of polarization of light along the fiber-optic link. There are three possible methods to do so. Either of them can be smoothly developed, provided that state of polarization varies very slowly in a real link. The first one is to include an adaptive control element of optical polarization (this device is commercially available) in one of the two optical inputs of the optical detection block. The second method is to achieve polarization diversity. This means to separate the two basic polarizations, detect them separately and then combine them. Please note that this implies duplicate the elements in the optical detection block and demodulation block. A third method makes possible an alternate modulation of the optical polarization of the laser output.

According to a feature of the present invention, advantageously, the receiver receives a transmitted optical signal S1 digitally modulated in phase (PSK or QPSK). One can also get an amplitude modulation or frequency. The phase, the amplitude or the frequency could also be analogically modulated.

The invention receiver also includes a regeneration block, which is needed in order to extract the information of the electrical signal obtained at the demodulation output block, and turn it into digital binary format. Advantageously, also the clock recovery (or synchronization) of the signal is performed in this block, to facilitate and improve the regeneration of the digital signal. At the entrance of this block, an electrical filter or equalizer may be placed, for equalization and limiting noise.

It should be noted that the local laser advantageously includes a circuit or system for monitoring the optical carrier to compensate possible drifts in laser wavelengths, transmitter or local, as well as a circuit or optical channel tuning control system, to tune a new wavelength or optical frequency. For this setting, the laser can take a local control signal error or feedback from somewhere in the receiver, enabling it to continually maximize the quality of the tune.

BRIEF DESCRIPTION OF THE DRAWINGS

For more understanding of what has been exposed some drawings are accompanying these descriptions, in which schematically and as an example non limitative, they represent a success story under development.

In the drawings.

DETAILED DESCRIPTION OF THE PRESENTLY PREFERRED EMBODIMENTS

Figure 1:
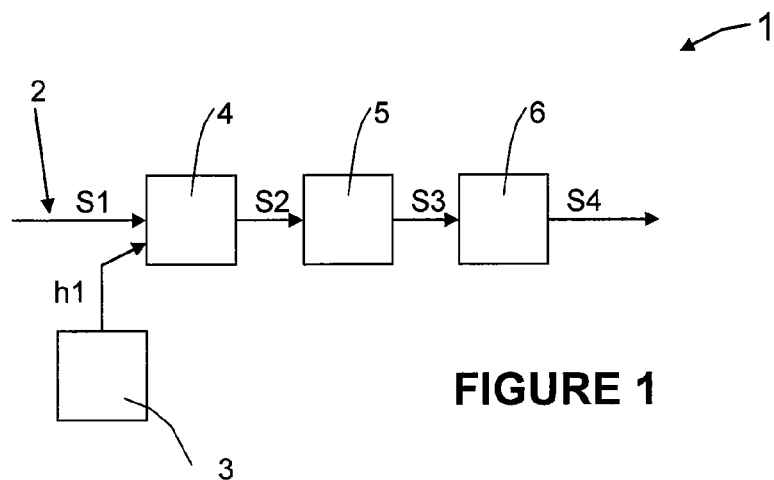
FIG. 1 is a block diagram of the optical communications receiver, according to a realization of the invention.

As can be seen in FIG. 1, the optical communications receiver (1) comprises mainly a single mode optical fiber (2), through which a modulated light S1 propagates and that is generated by a remote transmitter (not shown); a local laser block (3); an optical detection block (4); a demodulation block (5); and a signal regeneration block (6).

Thus, the signal that is carrying information S1 that propagates in the optical fiber input (2) and comes from the remote transmitter is introduced in the optical detection block (4), along with the light beam h1 generated by the local laser block 3 that has same nominal wavelength, playing the role of local oscillator. Inside block 4 both signals are coupled and photo-detected, converting the optical signal carrying information S1 into an electrical signal that carries information S2 by means of homodyne optical-electrical mixing. That signal S2 is processed in a demodulation block (5) that performs double differential demodulation of its in-phase and quadrature components, and combines them later.

The resultant information signal enters into a regeneration block (6), that recovers the synchronism of the signal and performs the bit decision, giving a digital signal in binary format at the output of the receiver. Importantly, in this preferred realization of the invention is not described any specific architecture of the regeneration block (6), as there are many commercially available schemes that perform as described. The choice of that block (6) depends on various factors, such as the transmission speed, or the signal modulation format, which must be assessed to suit the specific needs for each application.

It should be noted that in case of using a differential demodulation in the digital domain, blocks (5) and (6) would be embedded in a digital processor.

Figure 2:
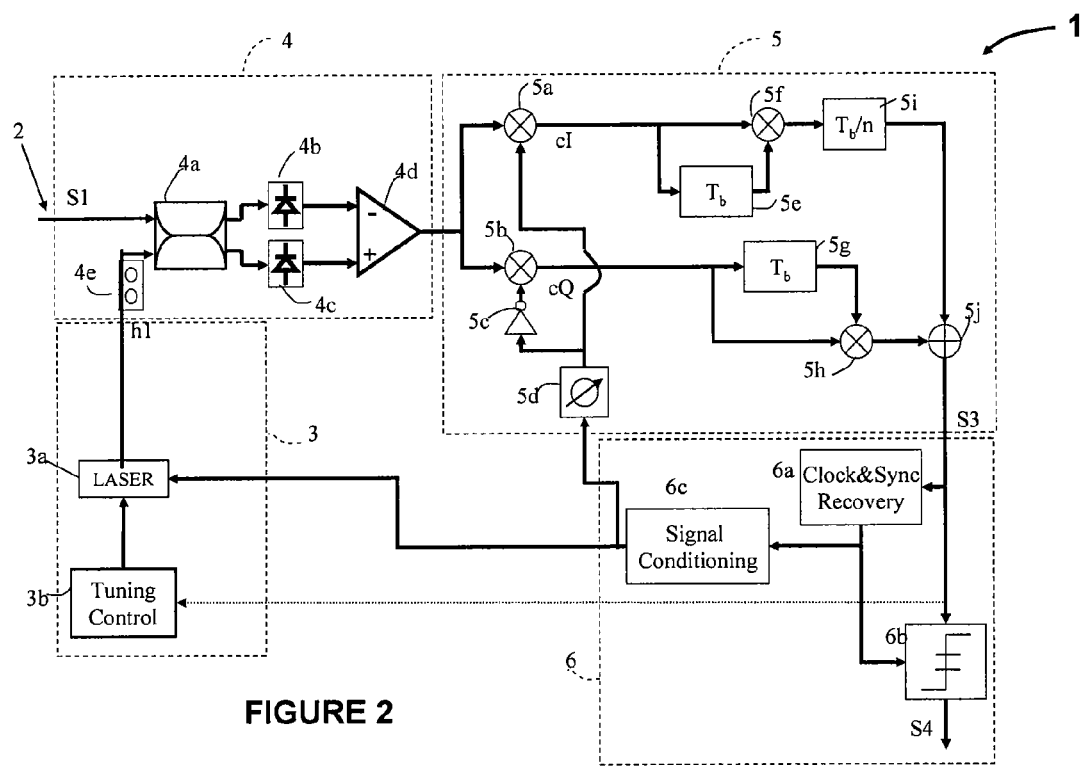
FIG. 2 is a diagram of an optical communications receiver for FIG. 1.

FIG. 2 shows the outline of a possible implementation of the receiver (1) according with the invention, and shows the components that implement each of the blocks mentioned in the preceding paragraph. Taking this scheme as a basis, we will describe the operation of this favorite realization of the optical communications receiver for, according to the invention.

The optical detection block (4), includes an optical coupler 4a, that combines its two optical inputs (S1+h1) and its outputs are connected to one or two balanced photo-detectors (4b, 4c). These photo-detectors detect light and generate one or two electrical currents that are subtracted (balanced scheme) and amplified by a differential amplifier (4d); giving at its output an electrical signal that carries information, with enough power level. To ensure that this is the WDM channel we want, at the amplifier output the electrical signal is filtered by a low-pass filter (not shown) giving signal S2. Since the information carrying signal S1 and the local laser beam (h2) have approximately the same optical frequency, signal S2 is baseband down-converted (intermediate frequency zero or very low). This block (4), also includes an optical polarization control (4e), in one of its inputs, to lock the states of polarization.

Advantageously, the information optical signal S1 is a phase modulated digital signal, PSK (or multilevel PSK) or QAM (or multilevel QAM).

Local laser block (3), essentially has a single-mode semiconductor laser device (3a), which generates a light beam in the same wavelength of the input signal S1, and acts as a local oscillator to tune the desired optical channel. A tuning control circuit or system (3b) actuates over one or more parameters, in order to adjust the laser wavelength. The electrical signal coming from the signal conditioning block (6c), is driven to the RF input of the local laser (3a). This block (6c) is responsible of processing clock signal obtained from synchronization recovery block (6a). It can contain a phase shifter that adjusts synchronism, filters and signal choppers to generate the relevant waveform; amplifiers and other components useful to transform the clock signal into the most advantageous signal, to be driven to the local laser. The bit period can alternatively be subdivided into smaller slots. Then, the signal conditioning block (6c) should also incorporate a frequency multiplier.

According to another possible implementation of the local laser block, at the laser output an optical phase modulator is connected. That phase modulator introduces a phase shift in the optical field, proportional to an electrical waveform that is introduced to the modulator's RF input. Thus the in-phase and quadrature components are also obtained after optical mixing. The electrical signal coming from the signal conditioning block (6c), is driven to the RF input of the phase modulator. This block (6c) is responsible of processing the clock signal obtained from synchronization recovery block (6a). The bit period can alternatively be subdivided into smaller slots. Then, the signal conditioning block (6c) should also incorporate a frequency multiplier.

In another possible realization of the laser local block, the laser device (3a) comprises any other laser device, semiconductor or not, but suitable for the receiver working properly. A couple of examples would use a continuous wave single-mode laser or a single-mode tunable laser.

Differential demodulation block (5), includes a first phase components separation into in-phase cI and quadrature cQ components (if they have not been separated in an earlier stage), through some mixers or switches (5a, 5b) driven by the sync signal or clock recovered from synchronization (6a), and after going through a phase shifter (5d), to adjust synchronism, and an inverter (5c) in one of the branches. Subsequently, after low-pass filtering, the in-phase component (cI) and the quadrature component (cQ) are differentially demodulated in each branch, being each signal multiplied itself by a mixer (5f, 5h), after a delay line (5e, and 5g). The two components are then re-synchronized again when passing through another delay line (5i), that delays one component by a half of the bit period. The two resulting signals are then combined in an adder or combiner (5j), in order to not loose information, because of the lasers' phase noise, and the information signal S3 is obtained.

In another possible realization, the adder (5j), can be replaced by a component that performs an AND/OR logic operation that advantageously combines the signals, to ensure enough signal level at the output. An example could be the choice of the differentially demodulated component that has more power in each case.

In another possible realization of the demodulator, the in-phase and quadrature components are not separated at the input, but are selected at the output; the output of the differential demodulator has a delay-and-add block that adds the signal with itself delayed by a half of a bit period, and the regeneration block (6), adjusts the optimal sampling time.

Decision block (6) fulfills the function of extracting the digital information contained in the electrical signal S3, and converts it into a binary format S4. It contains a sync recovery circuit (6a) that extracts the clock signal from S3 and a decision element (6b). This decision element compares the signal with a decision threshold in the optimum decision time given by the signal clock. Decision block also contains a signal conditioning block (6c), described when we were talking about block (3).

Another possible realization of the entire demodulation and decision blocks, is that it can be replaced by some Analog to Digital Converters (ADC) and a digital signal processor in order to perform relevant operations and demodulation in the digital domain.

Although everything that has been described can be large scale integrated, it must noted that another possible realization can be using connectors, cables and other elements of interconnection or adjustment of the optical and electrical signals before, after or within the blocks that constitute the receiver.

Despite all that has been described and represented is a concrete realization of the present invention, it is clear that a person skilled can introduce variations and modifications, or replace some details by others technically equivalent, without going out of the scope of protection defined by the claims attached.

The invention claimed is:

1. An optical communications receiver comprising a fiber optic first input element through which a signal carrying information circulates, a local laser block, an optical detection block, and a demodulation block wherein the information-carrying signal of the optical fiber input and a beam of light generated by the local laser block are coupled and detected in the optical detection block, down-converting the optical signal that carries information into a base-band electrical signal that carries information, which is processed in a block of electrical demodulation, that performs a differential demodulation of its in-phase and quadrature components, combining them later, wherein the block of electrical demodulation separates the in-phase component of the quadrature component using the signal generated in a signal conditioning block of a regeneration block, and wherein the receiver further comprises a phase shifter for phase shifting the output of the signal conditioner to generate a phase alteration signal synchronized with the bit time, said phase shifter being placed between the regeneration block and the local laser block or being contained by said signal conditioning block.

2. The receiver according to claim 1, wherein the receiver includes a phase shifter for phase shifting the synchronization control signal, placed between the regeneration block and the demodulation block; in order to synchronously separate the in-phase component from the quadrature component.

3. The receiver according to claim 1, wherein the optical detection block includes an optical coupler to combine the information-carrying signal and the light beam generated by the local laser block.

4. The receiver according to claim 1, wherein the local laser block includes a laser device, which is tuned to the same nominal wavelength that has the optical channel desired to receive.

5. The receiver according to claim 4, wherein the laser device comprises any type of laser device suitable for the proper operation of the receiver selected from a group comprising a continuous wavelength single-mode semiconductor laser, a single-mode tunable semiconductor laser, or a continuous wave single-mode laser.

6. The receiver according to claim 1, wherein the demodulation block comprises one or more differential demodulators that perform differential demodulation of both components, the in-phase and the quadrature components of the information signal.

7. The receiver according to claim 6, wherein the differential demodulation is performed by the multiplication, in one or two mixers, of the signal information itself delayed by a bit period.

8. The receiver according to claim 1, wherein a local laser is driven by an electrical signal, coming from a signal conditioning module, in order to heterodyne both optical signals in-phase and quadrature, and, thus, obtain a representation of the energy of the in-phase and quadrature components separately.

9. The receiver according to claim 1, wherein the local laser block comprises an optical phase modulator, which is driven by an electrical signal, coming from a signal conditioning module, in order to heterodyne both optical signals in quadrature and in phase, and, thus, obtain a representation of the energy of the in-phase and quadrature components separately.

10. The receiver according to claim 1, wherein the demodulation block combines each of the components (in-phase and quadrature), once differentially demodulated, by means of a block that implements a combination of advantageous mathematical operations of two signals which ensures the presence of enough signal level at the output by using one of (1) an adder, which adds the two differentially demodulated components; or (2) a block that implements the alternative choice of the differentially demodulated component that has more power in each case.

11. The receiver according to claim 1, wherein the optical detection block includes an optical coupler, that couples the signal, coming from the input fiber, and a light beam generated by the local laser block; and a photo-detector, which detects one of the outputs of the balanced optical directional coupler, and at its output produces a baseband signal that is then injected into a first amplifier for maximizing the signal level at the output of the optical detection block.

12. The receiver according to claim 11, wherein the detection block includes a second photo-detector, that receives the remainder of the optical coupler output; and whose output signal is subtracted from the first photo-detector's output signal, directly or by means of a differential amplifier placed in series/cascade, which amplifies and subtracts its inputs.

13. The receiver according to claim 1, wherein the optical detection block uses a homodyne detection system.

14. The receiver according to claim 13, wherein said homodyne detection system is based on a balanced scheme.

15. The receiver according to claim 1, further comprising a regeneration block.

16. The receiver according to claim 1, in which the received optical signal carrying information is modulated in one or more of the following formats:
   phase;
   the magnitude or intensity of light; or
   frequency.

17. The receiver according to claim 1, further comprising an adaptive element for optical polarization control in one of the two optical inputs of the optical detection block.

18. The receiver according to claim 1, further comprising at least one amplifier at the receiver side, or in between its constitutive blocks, in order to increase the signal level.

19. The receiver according to claim 1, further comprising at least one filter at the receiver side or among its constitutive blocks, to equalize the signal and limit noise that introduced by the system.

20. The receiver according to claim 1, in which connectors, cables and other elements of interconnection or adjustment of the optical and electrical signals are used before, after or within the constitutive blocks of the receiver.

21. The receiver according to claim 1, where the demodulation is performed in the digital domain by a digital signal processor.

* * * * *